United States Patent [19]

Scribner et al.

[11] Patent Number: 4,688,124
[45] Date of Patent: Aug. 18, 1987

[54] AUTOMATED FLOPPY DISK DRIVE LOADER

[75] Inventors: Richard A. Scribner, Fullerton; James A. Norton, Orange, both of Calif.

[73] Assignee: Media Systems Technology, Inc., Irvine, Calif.

[21] Appl. No.: 698,634

[22] Filed: Feb. 6, 1985

Related U.S. Application Data

[63] Continuation-in-part of Ser. No. 377,196, May 11, 1982, abandoned.

[51] Int. Cl.⁴ .................... G11B 5/012; G11B 5/016
[52] U.S. Cl. ..................................... 360/99; 360/98; 369/191
[58] Field of Search ........................ 360/97–99, 360/137, 130.24, 86, 91–92, 15; 271/1, 4, 131, 138, 144, 902; 369/180, 191, 201, 202

[56] References Cited

U.S. PATENT DOCUMENTS

| | | | |
|---|---|---|---|
| 3,549,866 | 12/1970 | McWade et al. | 271/131 |
| 3,756,608 | 9/1973 | O'Neill et al. | 360/92 |
| 3,758,122 | 9/1973 | Kawaharasaki | 360/92 |
| 3,846,836 | 12/1974 | Masse et al. | 360/98 |
| 3,926,426 | 12/1975 | Toriumi et al. | 271/3 |
| 3,931,640 | 1/1976 | Takahara et al. | 360/98 |
| 3,976,300 | 8/1976 | Bruer | 369/191 |
| 4,092,685 | 5/1978 | Sander et al. | 360/92 |
| 4,131,273 | 5/1977 | Kufrin et al. | 271/902 |
| 4,170,031 | 10/1979 | Beuch et al. | 360/98 |
| 4,195,321 | 3/1980 | Chelin et al. | 360/98 |
| 4,363,044 | 12/1982 | Castrodale et al. | 360/98 |
| 4,453,188 | 6/1984 | Johnson et al. | 360/98 |
| 4,510,542 | 4/1985 | Aggeler | 360/98 |

FOREIGN PATENT DOCUMENTS

| | | |
|---|---|---|
| 2099203 | 12/1982 | Japan. |
| 57-111856 | 6/1983 | Japan ................................. 271/902 |
| 0096383 | 6/1983 | Japan ................................. 271/902 |
| 0876557 | 9/1961 | United Kingdom. |
| 1021124 | 2/1966 | United Kingdom ................ 271/131 |

OTHER PUBLICATIONS

Assy Hopper; Media Systems Technology, Inc. Drawing No. 210.020, Jun. 9, 1979.
Larson et al., "Orient and Interlock Sensor Arrangement for Diskette Picker Mechanism", IBM T.D.B., May 1978, vol. 20, No. 12, pp. 5281–5286.
R. A. Johnson et al., "Magnetic Card Feeder", Xerox Disclosure Journal, Mar. 1981, vol. 6, No. 2, pp. 55–56.
Johnson et al., "Document Transport System," IBM T.D.B., Nov. 1970, vol. 13, No. 6, pp. 1468–1469.

Primary Examiner—John H. Wolff
Assistant Examiner—David J. Severin
Attorney, Agent, or Firm—Knobbe, Martens, Olson & Bear

[57] ABSTRACT

A mechanism is provided for automatically removing a floppy disk from a stack of floppy disks and removably inserting that floppy disk into a variety of disk drives. A reciprocating picker mechanism engages a floppy disk and pushes it into a first set of rollers which grippingly engage the floppy disk and push it towards a second set of rollers. The second set of rollers feeds the floppy disk into the disk drive and stops the floppy disk in the correct position within the disk drive. The rollers are disengaged from the floppy disk during operation of the disk drive, but re-engage to retract the floppy disk from the disk drive. An ejection guide plate directs the floppy disk into one of two bins after being removed from the disk drive. Detectors sense the edges of the floppy disk to control the speed at which the disk is placed into the disk drive, and to insure proper positioning of the disk within the disk drive. Positioning pins are attached to the sides of the various disk drives and cooperate with positioning recesses on the frame holding the rollers, so as to position the various disk drives with respect to the rollers.

22 Claims, 19 Drawing Figures

AUTOMATED FLOPPY DISK DRIVE LOADER

This application is a continuation in part of Ser. No. 377,196, filed May 11, 1982, abandoned, James A Norton, Inventor, that application being incorporated herein by reference.

BACKGROUND OF THE INVENTION

This invention relates to the floppy disks used to record information for computer devices, and more specifically to an automatic mechanism for feeding floppy disks into and out of a computer disk drive so that information can be coded onto, or read from, the floppy disk.

Floppy computer disks, or diskettes, are used in the data processing industry for storing computer programs, temporary storage of data, and numerous other storage functions. The floppy disks are generally flat, circular sheets of flexible plastic having a magnetic coating on which information can be stored. These circular plastic disks are stored inside of square envelopes or jackets which prevent the disk from being damaged and abraded, as well as providing a more convenient storage container. The floppy disk is generally thought of consisting of the circular plastic disk permanently enclosed in the square jacket.

The plastic disk has a central hole which fits over the hub or spindle of a computer disk drive so that the plastic disk can be rotated inside of the jacket. A magnetic recording or detecting head is located in the disk drive in order to read data from or write data onto, the spinning plastic disk.

Conventional mechanisms generally have a stack of floppy disks which are fed into a disk drive one at a time. After information is coded onto or read from the plastic disks, the floppy disk is ejected into a receiving bin. In some cases, the disk drive verifies that the program has been correctly recorded onto the floppy disk. If an error is detected, then the floppy disk is ejected into a reject bin.

Prior art loading and unloading mechanisms occasionally damaged the plastic disks when the floppy disks were literally thrown into the disk drive. Further, the plastic disks would occasionally slide to one end of the protective jacket so that the hub or spindle on the disk drive did not properly engage the hole in the floppy disk. Improper engagement could either damage the plastic disk, or jam the disk drive. There is thus a need in the industry for a loading and unloading device which can quickly and accurately position the floppy disks in a disk drive, without harming the flopp disks.

There is a large variety in the types of disk drives presently used in the computer industry. This variation in the construction and dimensions of the various disk drives made it difficult to produce a loading and unloading mechanism which can accommodate a large variety of disk drives without requiring protracted installation and alignment procedures, as well as periodic recalibration of the disk drive alignment. There is thus a need in the industry for a floppy disk loading and unloading mechanism which can accurately position floppy disks in a variety of disk drives, or preferably, is designed for interchangeable disk drives.

SUMMARY OF THE INVENTION

A vertical stack of floppy disks is placed into a generally vertical loading chute. The bottom of the loading chute is at an angle with respect to the horizontal plane. Positioning tabs on one end of the loading chute insure that the floppy disks are correctly positioned in the bottom of the loading chute, but also insure that a center hole in the plastic disk is suitably located within the protective jacket of the floppy disk.

An exit slot adjacent the bottom of the loading chute allows the bottom floppy disk to be removed from the stack. A retaining lip holds the floppy disk in position until the bottom disk is ready to be removed. A picker mechanism engages the hole in the floppy disk and, after lowering the retaining lip, moves the bottom-most floppy disk through the slot and into a first set of rollers which frictionally engage the jacket on the floppy disk in order to help remove the floppy disk from the loading stack. After the bottom-most floppy disk is removed, the retaining lip returns to its retaining position and the picker mechanism reciprocates to engage the hole in the next floppy disk in the stack.

Frictional engaging surfaces of the first set of rollers pull the floppy disk from the bottom of the loading stack and off of the picker mechanism. A first sensor verifies that the first set of rollers have engaged a floppy disk and provides a signal to reduce the speed of the rollers. The part of the picker mechanism which engages the hole on the floppy disk is tapered so that there is a raised edge which can engage and push the floppy disk into the first set of rollers. Adjacent this raised engaging edge is a tapered surface which allows the floppy disk to be pulled over the engaging edge without substantial hindrance or damage to the floppy disk.

The first set of rollers pushes the floppy disk into a second set of rollers. A second sensor verifies that the floppy disk is being fed from the second set of rollers into the disk drive. The first and second set of rollers are oriented on an inclined plane substantially parallel to the angle on the bottom of the loading mechanism. The second set of rollers is mounted on the edge of a guide plate which serves to guide the flexible floppy disk into the second set of guide rollers as the floppy disk extends from the first set of rollers.

The second set of rollers pushes the floppy disk into the disk drive. Frictional engaging surfaces on the second set of rollers maintain contact with the protective jacket as the floppy disk is inserted into the disk drive. The first sensor detects the trailing edge of the floppy disk and stops the second set of rollers so that the floppy disk is correctly and positively positioned in the disk drive. This positive positioning of the disk drive minimizes damage to the floppy disk while insuring accurate positioning of the floppy disk. Further, the first sensor's use to reduce the drive speed of the first and second set of rollers allows the floppy disk to be inserted into the disk drive as quickly as possible, yet at a slow enough speed to prevent damage to the floppy disk or jamming of the disk drive.

Even greater positioning accuracy can be achieved by back driving the second set of rollers just prior to stopping the floppy disk in the disk drive. This back driving of the rollers prevents the floppy disk from hitting the end of the disk drive and bouncing back into an incorrect position. This reverse drive also helps achieve a fast turnaround on the floppy disks by minimizing the time required to safely insert and remove the floppy disks from the disk drive.

Once a floppy disk is inserted into the disk drive, a drive spindle engages the floppy disk so that it may be rotated within the protective jacket in order to be recorded or read. As the drive spindle engages the hole in the floppy disk, a lever connected to the mechanism which lowers the drive spindle causes the second set of rollers to separate slightly and release the edge of the jacket so that the plastic disk is free to rotate in its jacket.

A motor with an offset circular cam moves an engaging lever to cause the drive spindle to engage and disengage the plastic disk. Two position sensors on the offset circular cam monitor the position of the engaging lever. The circular cam is preferably driven by a direct current motor so that merely reversing polarity of the current reverses rotation of the motor, thus, causing the spindle to disengage from the plastic disk. Reversing the direction of the circular cam prevents forcing the drive spindle into the plastic disk in the event the hole in the plastic disk is not properly centered under the spindle. As the drive spool disengages the plastic disk the engaging lever raises so that the friction surfaces on the second set of rollers reengage the jacket of the floppy disk.

The floppy disk is removed from the disk drive by reversing the rotational direction of the second set of rollers.

The disk drive is located in a substantially horizontal plane while the entrance path from the first and second sets of rollers is inclined with respect to the horizontal. Thus, the floppy disk is not directed back towards the first set of rollers as the floppy disk is removed from the disk drive. An ejection guide plate helps prevent the floppy disk from inadvertently bending and reentering the first set of rollers.

A rotationally mounted selection plate can be added to direct the floppy disk into either an accept bin or into a reject bin. A rotary solenoid rotates the selection plate so that it causes the floppy disks to continue on a substantially horizontal line to be directed into the accept bin. If the floppy disk is to be rejected, the solenoid rotates the selection plate so that it directs the floppy disk downward into a reject bin.

The disk drive is horizontally mounted onto an engaging surface located at a predetermined position and orientation with respect to the first and second set of rollers. The disk drives produced by the various manufacturers have attachment holes located on opposite sides of the disk drive. A positioning plate is designed for each particular disk drive such that the positioning plate can fasten to each side of the disk drive yet have positioning dowels fastened at a predetermined location with respect to the disk drive. These positioning dowels are placed upon the positioning surface of the frame and locked in an engaged position. When the positioning dowels closest to the entrance of the drive mechanism are engaging a positioning recess on the positioning surface, then the drive mechanism will be correctly positioned with respect to the first and second set of rollers.

A spring-loaded lock on the rear set of dowels serves to force the front set of positioning dowels into the positioning recess. Thus, by attaching a positioning plate to the various disk drives, a number of different disk drives can be used with the automatic loader mechanism of this invention. The positioning plate will insure that each particular disk drive is correctly positioned so that it can be quickly and easily installed into correct and accurate alignment with the first and second set of rollers. There is thus, advantageously provided a means of quickly changing disk drives in the loader mechanism of this invention.

DETAILED DESCRIPTION OF THE PREFERRED EMBODIMENT

Figure 13:
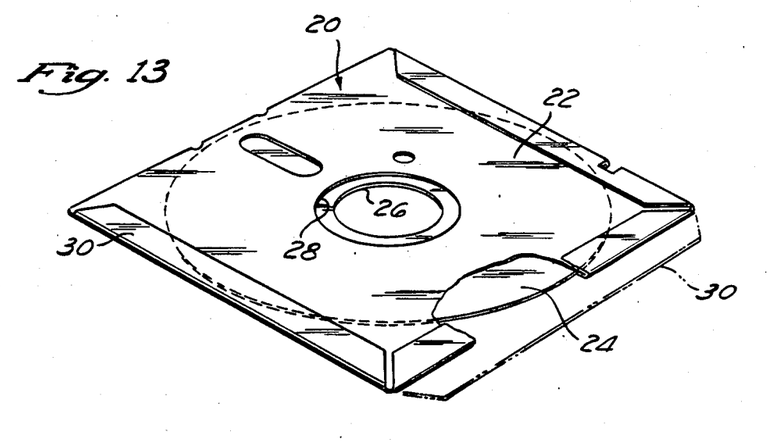
FIG. 13 shows a floppy disk as used in this invention.

FIG. 13 shows a floppy disk 20 which contains a flexible disk 24 which is generally made of plastic and coded with an electromagnetic substance so that the disk 24 can be electromagnetically coded with information. In order to prevent damage to the disk 24, a jacket 22 is placed around the disk 24. The jacket 22 is generally square in shape for ease of storage and handling, and is typically made of paper material such as thin cardboard or paper. The disk 24 has a circular aperture or hole 26 at its center. The jacket 22 has a corresponding hole 28 which is larger in diameter than the hole 26 in the disk 24. The jacket 22 is larger than the disk 24 and is designed so as to allow the disk 24 to be rotated about the center of the hole 26 while the disk 24 is still within the jacket 22.

Typically the jacket 22 is 5.25×5.25 inches square with a jacket hole 28 of approximately 1.25 inches. The disk 24 is typically 5.25 inches in diameter with a hole 26 of approximately 1.125 inches in diameter. The disk 24 is typically between 0.030 to 0.080 inches thick. The floppy disk 20 is generally manufactured by placing the disk 24 inside a jacket 22 and then folding the edges or flaps 30 over and sealing them onto the flats sides of the jacket 22. Some manufacturers do not seal all of the flaps 30 until the disk 24 has been coded with information and tested to verify that the information was correctly coded onto the disk 24. For these manufacturers, the disk drive loader must be able to accommodate floppy disks 20 having an unfolded flap 30 (shown in phantom) which is approximately 0.43 inches long.

Figure 1:
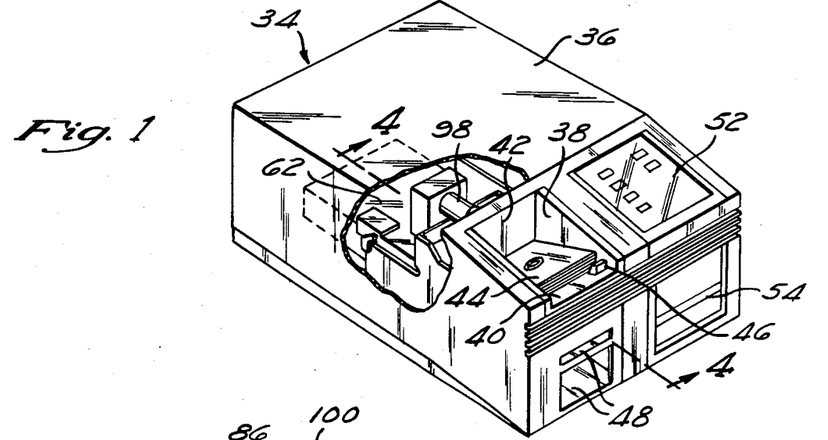
FIG. 1 is a perspective view of the floppy disk loader of this invention.

FIG. 1 shows the exterior of a automatic floppy disk drive loader 34 of this invention. The interior mechanism of the disk drive loader 34 is emclosed by a housing 36 having a generally rectangular, box-like shape. Toward one corner of the housing 36 is a vertically oriented loading chute 38 which is designed to receive a stack 44 of floppy disks 20. The loading chute 38 has a bottom 40 and a back wall 42. Located below the loading chute 38 is an exit chute 48 which contains a rotatable, ejection selector plate 50 (FIG. 4) which is selectively controlled to direct exiting floppy disks 20 into either a reject bin (not shown) or an accept bin (not shown). A control panel 52 is located adjacent the loading chute 38 and is used to control the recording and/or reading of the floppy disks 20 in the disk drive loader 34. A loading door 54 is used to place a master disk (not shown) into the disk drive loader 34 so that the data on the master disk can be recorded onto, or compared with, the data on the floppy disks 20. Preferably, a hard disk (not shown) is used as the master disk.

Referring still to FIG. 1, the bottom 40 of loading chute 38 is downwardly inclined with respect to the horizontal. Thus, a generally horizontally oriented stack 44 of floppy disks 20 is also inclined downwardly with respect to the horizontal since the stack 44 rests on the bottom 40. In order to correctly position the floppy disks 20 on the bottom of the stack 44, tapered guide blocks 46 are used to urge the floppy disks 20 on the bottom of the stack 44 towards the back wall 42 of the loading chute 38. Internal to the housing 36 is a disk drive 62 into which the floppy disks 20 are inserted and removed by the mechanism described hereinafter.

Figures 2, 3:
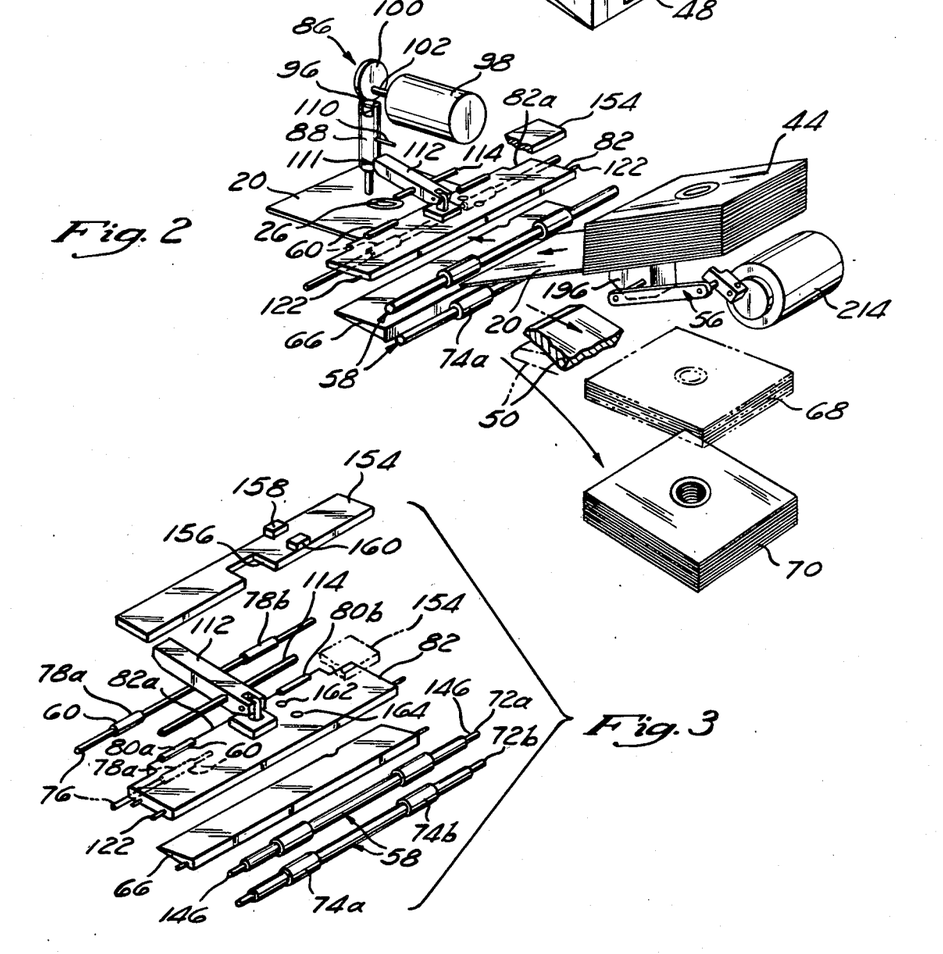
FIG. 2 is a perspective view of the main elements of the mechanical transport mechanism which handle the floppy disk in this invention.
FIG. 3 is an exploded perspective view of the first and second set of rollers of this invention.

FIG. 2 shows a simplified view of the main elements of the mechanical transport mechanism of the disk drive loader 34. Briefly described, a picker mechanism 56 transfers the bottom-most floppy disk 20 from the stack 44 to a first set of roller 58. The first set of rollers 58 feeds the engaged floppy disk 20 into a second set of rollers 60 which, in turn, positions the engaged floppy disk 20 in a disk drive 62 (FIG. 1) so that a drive spindle 64 (FIG. 4) can engage and rotate the disk 24. The disk drive 52 then records or reads the data which is stored on the then rotating disk 24 in the floppy disk 20.

After the drive spindle 64 stops rotating the disk 24 and disengages the floppy disk 20, the second set of rollers 60 reverses direction to pull the floppy disk 20 out of the disk drive 62 (FIG. 1). An ejection guide plate 66 insures that the exiting floppy disk 20 does not exit upward along the downwardly inclined bottom 40 of the loading chute 38 (FIG. 1), but rather exits toward the ejection selector plate 50 so that the floppy disk 20 can be directed into a stack 68 of accepted floppy disks 20 or into a stack 70 of rejected floppy disks 20.

FIG. 3 shows an exploded perspective view of the first set of rollers 58 which comprise two generally parallel shafts 72a and 72b, each of which contains two laterally spaced friction surfaces 74a and 72b. A durable material which can frictionally, yet resiliently engage the jacket 22 is desired for the friction surfaces 74. Cylindrical segments of rubber approximately 0.75 inches long and 0.469 inches in diameter have been found suitable for the friction furfaces 74. Only one of the shafts 72 needs to be rotated, with the other shaft 72 acting as an idler. In the preferred embodiment, the lower shaft 72b is the driven member.

The second set of rollers 60 comprises a lower driven shaft 76, containing laterally spaced frictional surfaces 78a and 78b. A pair of upper, laterally spaced frictional rollers 80a and 80b are mounted on a trailing edge 82a of an upper guide plate 82. The upper frictional rollers 80a and 80b act as idler rollers to the lower driven shaft 76 on the second pair of rollers 60. Making the upper frictional rollers 80a and 80b out of 0.188 inch diameter delrin has been found suitable in practice, when use in conjunction with 0.188 inch diameter rubber frictional surfaces 78a and 78b on the lower drive shaft 76.

Figure 4:
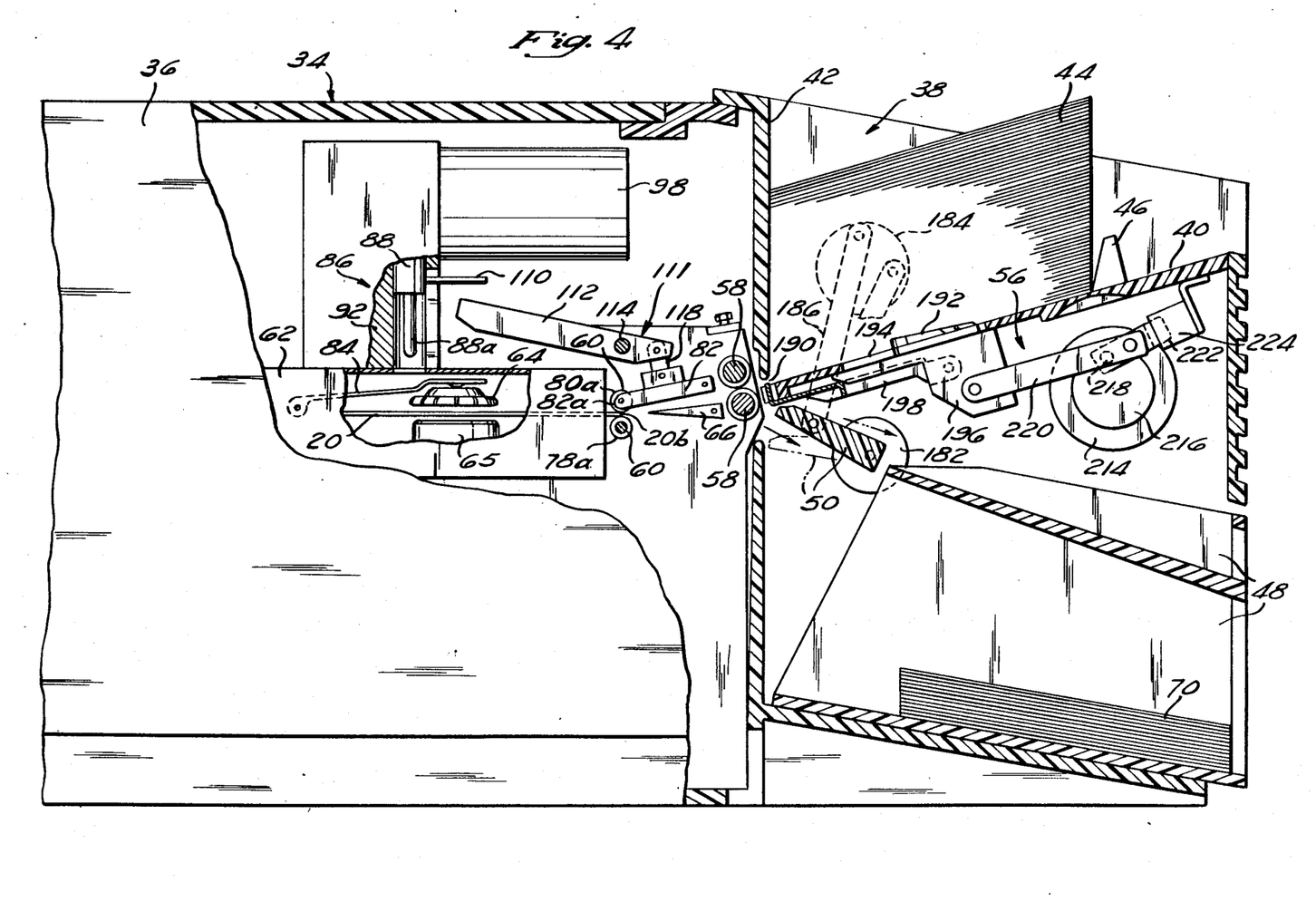
FIG. 4 is a partially sectioned view of the loader of this invention taken along 4—4 of FIG. 1.

Referring now to FIG. 4, the first set of rollers 58, and the second set of roller 60, are oriented along a plane substantially parallel to, and extending from, the bottom 40 of the loading chute 38. The ejection guide plate 66 is located between the first set of rollers 58 and the second set of rollers 60. The ejection guide plate 66 has a cross-sectional shape which is generally triangular so that it forms a knife edge which faces the edge of the floppy disk 20 as it leaves the disk drive 62 (not shown). The upper guide plate 82 and the ejection guide plate 66 are located on opposite sides of the path which the floppy disk 20 takes in travelling from the first set of rollers 58 to the second set of rollers 60. Thus, the upper guide plate 82 and the ejection guide plate 66 help to guide the floppy disk 20 into the second set of rollers 60.

The disk drive 62 is located in a substantially horizontal plane and contains internal guide means (not shown) for directing the floppy disk 20 once the floppy disk 20 begins to enter the disk drive 62. The disk drive 62 also contains a drive spindle 64 which is hinged from a cantilevered level 84. A reciprocating plunger 86 can selectably press the lever 84 downward so that the drive spindle 64 clamps the disk 22 between the drive spindle 64 (FIG. 13) can then be rotated within the jacket 22 (FIG. 13) of floppy disk 20.

Figure 7:
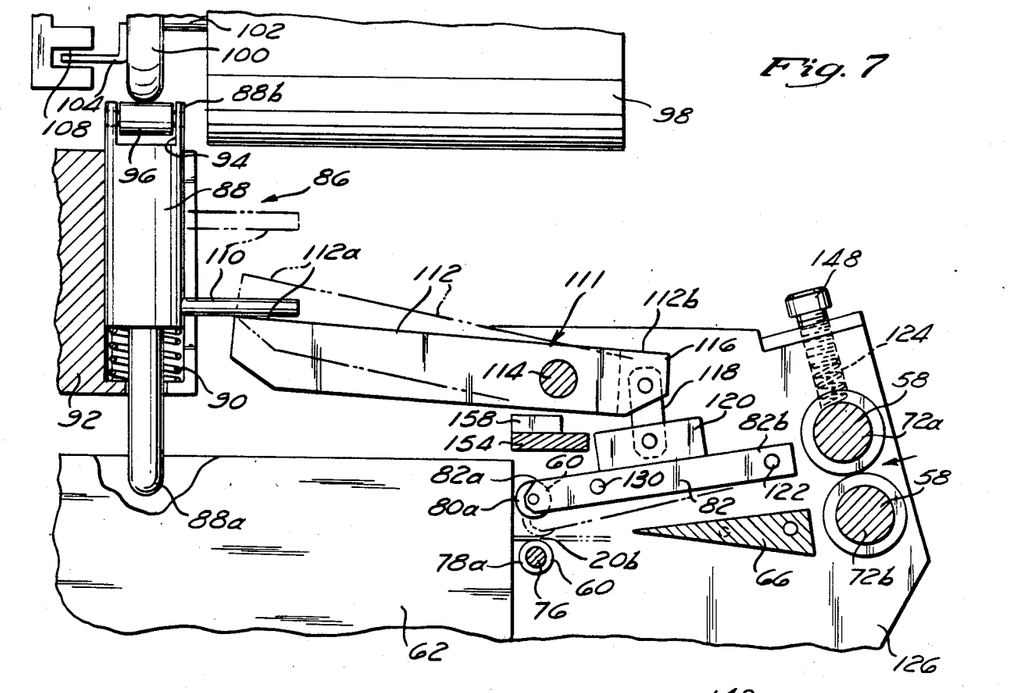
FIG. 7 is a partial sectional view of the disengaging mechanism and roller mechanism of this invention.
Figures 8, 9, 10, 11:
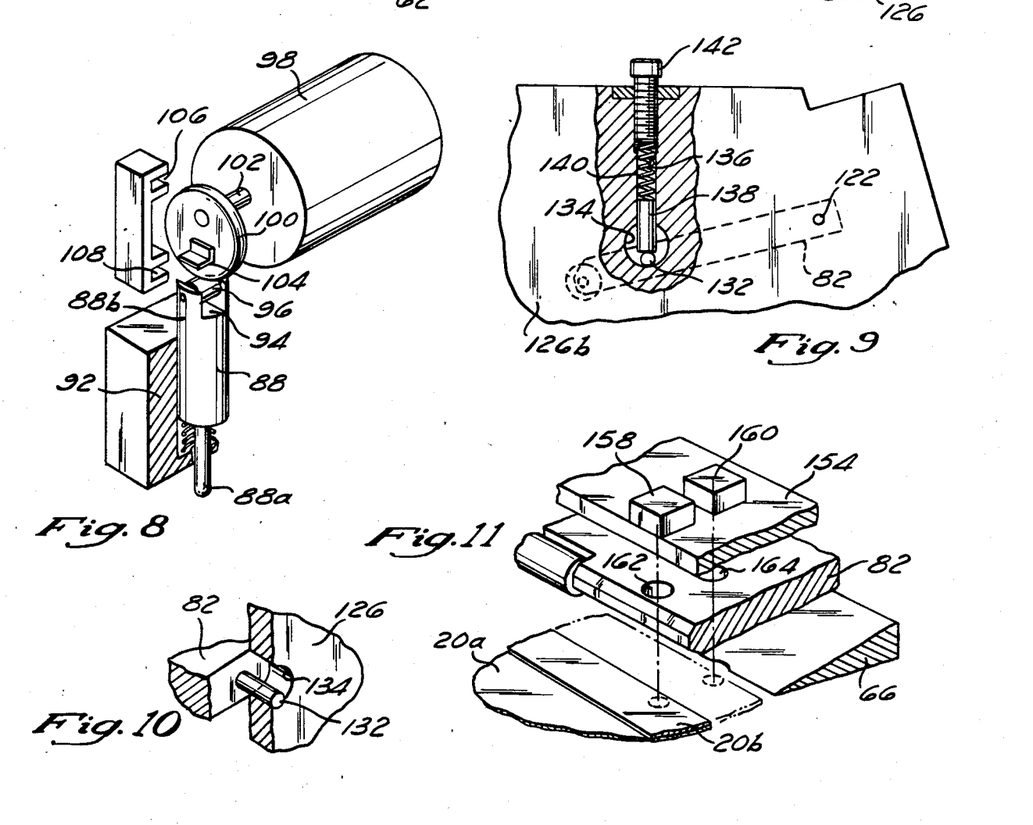
FIG. 8 is a partially sectioned perspective view of the plunger drive mechanism of this invention.
FIG. 9 shows one means for preloading the rollers of this invention.
FIG. 10 shows the end of a preload shaft of this invention.
FIG. 11 shows the floppy disk sensors of this invention.

Referring primarily to FIG. 7, but also to FIGS. 2, 4 and 8, the reciprocating plunger mevchanism 86 comprises a vertically oriented plunger 88 which is limited to vertical motion by being at least partially contained in a housing 92 which is fixed or structurally grounded with respect to the housing 36 and the disk drive 62. The housing 92 is generally the same shape as, but slightly larger than, the plunger 88 so that the plunger 88 can move upwards and downwards in the housing 92. A contacting end 88a is oriented so as to contact the cantilever lever 84 in order to frictionally engage the floppy disk 20 between the drive spindle 64 and the spindle drive 65. The plunger 88 is urged away from engaging the cantilevered lever 84 by resilient means such as coil spring 90. The opposite, or distal end 88b of plunger 88 contains a yoke, such as a slot or generally rectangularly shaped aperture 94 across which is preferably mounted a rotatably supported shaft 96. A plunger drive motor 98 drives the plunger 88 upwards and downwards against the spring 90. The motor 98 is preferably a DC motor having a torque of 20 ounce-inch at 65 rpm, and a gear reduction of about 34:1. The normal voltage applied to motor 98 is 24 volts.

Referring primarily to FIG. 8, but also to FIGS. 2 and 7, a circular cam 100 contacts the shaft 96 to actuate the plunger 88. The cam 100 is shown as comprising a circular disk approximately one inch in diameter and 0.188 inches thick. The cam 100 is mounted eccentrically with respect to a drive shaft 102 on the motor 98. In the preferred embodiment this eccentric mounting is 0.25 inches. Thus, each rotation of the drive shaft 102 of the motor 98 causes the portion of the cam 100 contacting the shaft 96 tomove a vertical distance equal to twice the eccentric mounting, or 0.50 inches. The shaft 96 allows rotational contact with cam 100 and causes the plunger 88 to move upwards and downwards depending on the motion of cam 100.

A projection 104, mounted to rotate with the cam 100, intersects detectors such as photodetectors 106 and 108 in order to monitor the maximum oscillations of the cam 100, and thus the extreme positions of the plunger 88. The plunger 88 is lowered to cause engagement of the floppy disk 20 by rotating the cam 100 by one-half a revolution. When the cam 100 is in its lowest position, the contacting end 88a of plunger 88 should cause engagement of the drive spindle 64 and spindle drive 65 with the floppy disk 20, and simultaneously cause the projection 104 to be detected by the lower detector 108. To raise the plunger 88 and disengage the floppy disk 20, the current on the motor 98 is reversed so that the cam 100 rotates so as to cause the projection 104 to intersect the upper detector 106. The spring 90 urges the plunger 88 vertically so as to disengage the contacting end 88a from the cantilevered lever 84 (FIG. 4), insuring disengagement of the floppy disk 20 (FIG. 4).

Reversing the current on the motor 98 in order to reverse rotation of the cam 100 helps minimize damage to the floppy disk 20. If the floppy disk 20 is properly oriented between the drive spindle 64 and the spindle drive 65, it is possible that these drive elements could be damaged by forcing the plunger 88 to undergo its maximum travel as would occur if the cam 100 were rotated through a complete revolution. By reversing the rotation of the cam 100, the plunger 88 is not forced to travel through its maximum limits and thus any damage is minimized to any object inhibiting full travel of the plunger 88. Since the motor 98 is preferably a DC motor, this reversal can be accomplished by reversing the current to the motor 98. The detectors 106 and 108 monitor the position of the cam 100 and thus of the plunger 88 to provide a means of indicating when the floppy disk 20 is not being properly engaged in the disk drive 62.

Referring primarily to FIG. 7, but also to FIGS. 2 and 4, the disengaging means 111 for releasing the pressure which the second pair of rollers 60 exerts the trailing edge 20b of the floppy disk 20 will be described. Projecting horizontally from the plunger 88 is a projection 110. The projection 110 extends through a slot in the plunger housing 92. The projection 110 moves vertically upwards and downwards with the plunger 88.

As the plunger 88 moves downward to cause engagement and rotation of the disk 24 in the disk drive 62, the projection 110 moves downward and engages an end 112A of a lever 112 which is rotationally mounted on a shaft 114. The shaft 114 is located towards the distal end 112B of the lever 112 opposite the projection 110, so that a mechanical advantage can be gained by having the projection 110 exert a downwards force on the lever 112. In the preferred embodiment, the lever 112 is approximately 2.4 inches long, with the shaft 114 being located approximately 1.9 inches from the end 112A which contacts the projection 110.

The distal end 112B has a yolk 116 which is connected to a generally vertically oriented linkage or toggle 118. The toggle is about 0.4 inches from the shaft 114. A first end of the toggle 118 rotatably connects to the yolk 116, while the opposing end of the toggle 118 rotatably connected or is pinned to a block 120 which in turn is attached to the upper surface of the upper guide plate 82. The block 120 is attached adjacent the trailing edge 82a of the upper guide plate 82. The upper guide plate 82 in turn is rotationally mounted at one edge of upper guide plate on pivot shaft 112, which shaft is located adjacent the leading edge 82B, adjacent the first set of rollers 58.

This disengaging means 111 thus allows the plunger 88 to exert an upward leveraged force on the toggle 118 which in turn causes the upper guide plate 82 to pivot upwards about the pivot shaft 122. Thus, the upper frictional rollers 80a and 80b are moved away from the lower drive shaft 76 so as to disengage the second set of rollers 60 from the trailing edge 20b of the floppy disk 20.

Both the first and second set of rollers 58 and 60, respectively, are spaced a preset distance, apart and are spring preloaded to exert a predetermined force against any floppy disk 20 which is thicker than the predetermined spacing. FIGS. 9 and 10 show a typical means for spring preloading one of the shafts in a manner so as to position a shaft, allow motion of the shaft within a predetermined amount and also provide a preload to the shaft. For example, the preload on the secondset of guide rollers 60 is caused by having the upper guide plate 82 supported by two shafts, a pivot shaft 122 (FIGS. 7 and 9), and a preload shaft 130 (FIGS. 7 and 9). The preload shaft 130 is located towards the trailing edge 82a of the upper guide plate 82.

As shown in FIG. 10, an end of a shaft, such as is used to limit the motion of the rollers and preload the rollers, such as the second set of rollers 60. The shaft end 132 is fastened to the upper mounting plate 82 adjacent the axis of the second set of rollers 60. The end 132 extends into a aperture, such as circular hole 134 which is oriented perpendicularly to the side plates 126 so as to extend through the thickness of the side plates 126.

FIG. 9 shows a cylindrical hole 136 drilled in the plane of the side plate 126 which connects the hole 134 to an exterior edge of the side plate 126. The diameter of the hole 134 is larger than the diameter of the shaft end 132, the difference in diameters affecting the amount of motion which is dsired to be permitted. The location of the shaft holes, such as hole 136, determines the initial gap between the first and second sets of rollers 58 and 60, respectively. A slug 138 is placed into one end of the hole 136 and extends through the bottom of the hole 136 until it contacts the shaft end 130. Thus, the slug 138 is constrained to travel along the length of the hole 136. A coil spring 140 is placed into the hole 136 and compressed by a fastener such as screw 142 which is threadably inserted into the end of the hole 136 adjacent the edge of the plate 126. The spring 140 serves to preload the slug 138 against the shaft end 130. Thus, the shaft end 132, and the shaft 130, are limited to the amount of travel permitted by the diameter of the hole 134 and the amount by which the spring 140 can be compressed before it bottoms out and prevents further movement of the slug 138. The preload exerted by the spring 140 determines the ease with which the upper guide plate 82 can be rotated, and also determines the preload exerted between the second set of guide rollers 60.

In the preferred embodiment, the second set of guide rollers 60 are preferably separated by a gap of 0.10 inches, and have a preferred preload of 1.756 pounds. The second set of rollers 60 is spring preload together with a spring constant of 15.222 pounds per inch.

Figure 5:
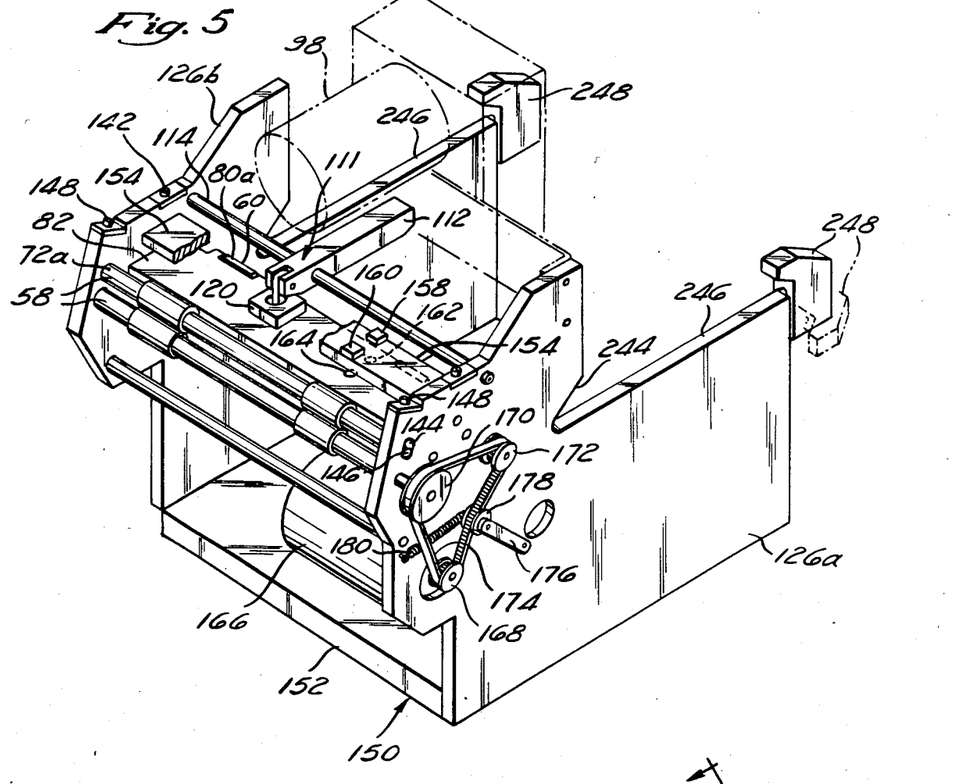
FIG. 5 is a perspective view taken from 5—5 of FIG. 6, without a disk drive present.

A similar means of allowing motion of the shaft 72a on the first set of rollers 58 is indicated in FIG. 5 which shows a slot 144 into which is inserted a reduced diameter end 146 (FIG. 3) of shaft 72a on the first set of rollers 58. Fastener 148 corresponds to the screw 142 illustrated in FIG. 9. FIG. 7 shows this preload means in more detail wherein a coil spring 124 is contained in a side plate 126, which side plate 126 holds the ends of the first set of rollers 58. The coil spring 124 is trapped in a compressed condition in a cylindrical hole between one end of the shaft 72a of the first set of rollers 58, and an external edge of the side plate 126 by the head of bolt 148. Thus, the preload exerted by the coil spring 124 pushes the shaft 72a against the shaft 72b so as to preload the first set of rollers 58. The first set of rollers 58 are preferably not separated by a gap and have a preferred preload of 1.804 pounds. The first set of rollers 58 are spring preloaded together at a spring rate of 18.5 pounds per inch.

FIG. 5 shows a frame 150 which is contained in the housing 36. The frame 150 has a bottom plate 152 with substantially parallel, and opposing side plates 126A and 126B, being oriented perpendicular to the bottom plate 152. The first and second sets of rollers 58 and 60 extend between, and are supported by, the side plates 126. The same is also true of the pivot shaft 114 on the disengaging means 111.

Also extending between side plates 126 is a support bar 154 which is mounted above the upper guide plate 82. The support bar 154 has a cut-out 156 (FIGS. 3 and 6) in order to avoid interference with the block 120 of the disengaging means 111. Mounted on the support bar 154 are two detectors or photodetectors such as infared sensors 158 and 160. The sensors 158 and 160 are laterally spaced along a line in the direction of travel of the floppy disk 20 as it is inserted into the disk drive 62. The sensors 158 and 160 are positioned above corresponding apertures such as holes 162 and 164, respectively, (see FIG. 3) in the upper support plate 82 so the sensors 158 and 160 can detect the floppy disk 20.

Referring to FIG. 111, the sensor 160 is located toward the ejection guide plate 66, and away from the disk drive 62 (not shown). The sensor 160 senses the edges of the floppy disk 20 through the hole 164 in the upper guide plate 182, as the floppy disk 20 travels from the first set of rollers 58 (FIG. 5) towards the second set of rollers 60 (FIG. 5). Sensing the leading edge of the floppy disk 20 signals that the picker mechanism 56 has successfully removed a floppy disk 20 from the stack 44 and inserted that floppy disk 20 into and through the first set of rollers 58. The signal from the sensor 160 also indicates that a floppy disk 20 is about to enter the second set of guide rollers 60 and thus enter the disk drive 62. The signal from the sensor 160 can thus be used to slow down the speed at which the floppy disk 20 is being transported. Preferably, the signal from the photodetector 160 is used to trigger a speed reduction in the motors which drive the first and second sets of rollers 58 and 60 so that the speed of the floppy disk 20 is reduced to approximately one-half of the speed of the floppy disk 20 as it originally passed through the first set of rollers 58, which speed is about 30.2 inches per second.

In practice, it has been found suitable to drive the first set of rollers 50 with the DC motor 166 (FIG. 5) at a voltage of 15 volts. A 15 ohm resistor is added to the line voltage to reduce the voltage to the motor and reduce the speed of the first set of rollers 58. The motor 166 (FIG. 5) is shut off when the sensor 160 detects the trailing edge 20b of the floppy disk 20.

If the sensor 158 does not detect the leading edge 20a of the floppy disk 20 shortly after detection by the sensor 160, then the rollers 58 and 60 are stopped and a signal given that the loading mechanism is jammed.

After the first set of rollers 58 disengages from the floppy disk 20, the second set of rollers 60 pushes the floppy disk 20 into the disk drive 62 at a safe rate and positively positions the floppy disk 20 in the disk drive 62 in order to prevent damage to the floppy disk 20. Previous devices had relied on the accumulated momentum of the floppy disk 20 to carry the floppy disk 20 into the disk drive 62. As a result, the floppy disk 20 sporadically landed in the incorrect position, bounced into an incorrect position, or damaged the edges by bouncing within the disk drive 62.

As the trailing edge 20b (see also FIG. 4) is detected by the sensor 160, through the aligned hole 164 in the upper guide plate 182, the second set of drive rollers 60 is stopped so as to correctly and positively position the floppy disk 20 in the disk drive 62. It has been found preferably to actually begin to back-drive the second set of guide rollers 60 in order to cancel out the rotational inertia and thus obtain the fastest possible insertion speed, with the greatest accuracy. Thus, the motor 166 (FIG. 5) driving the second set of rollers 60 is back-driven for approximately 13 microseconds at full torque. It has been found suitable to drive the second set of drive rollers 60 with a DC motor and to simply reverse the polarity of the current in the DC motor and to vary the voltage in order to regulate the amount of back-driving torque. Thus, the second set of drive rollers 60 is normally driven by a 4 ounce-inch DC motor at 24 volts, and is back-driven for approximately 13 microseconds at a voltage of 24 volts in order to stop and correctly position the floppy disk 20 in the disk drive 62. When correctly positioned, the floppy disk 20 extends from the disk drive 62 by about 0.13 inches, and is gripped by the second set of rollers 58, until released.

As shown in FIG. 7, the sensor 158 partially overlaps or overlooks the second set of guide rollers 60 so that the second set of guide rollers 60 partially block the field of view of the sensor 158. This partial blockage increases the sensitivity of the sensor 158 and also serves to accurately determine when the trailing edge 20b of the floppy disk 20 first enters, the second set of rollers 60. When the floppy disk 20 is correctly inserted into the disk drive 62, the trailing edge 20b of the floppy disk 20 cannot be detected by the sensor 158.

Some manufacturers prefer to have the floppy disks 20 inserted into their disk drive 62 before the jacket 22 (FIG. 13) is completely sealed so as to permanently enclose the disk 24 (FIG. 13) in the jacket 22. For such manufacturers, the disk drive loader must be able to accommodate floppy disks 20 which have an unfolded flap 32 (FIG. 13). Accommodating the extra 0.43 inches for the unfolded flap 32 (FIG. 13) is done by moving the sensor 158 0.43 inches away from the disk drive 20 and toward the first set of rollers 58. The corresponding hole 162 in the upper guide plate 82 is also moved. In the preferred embodiment, an extra hole can be drilled into the upper guide plate 82 at the correct location and suitable mounting means can be provided for repositioning the sensor 158 in the ultimate location.

Figure 6:
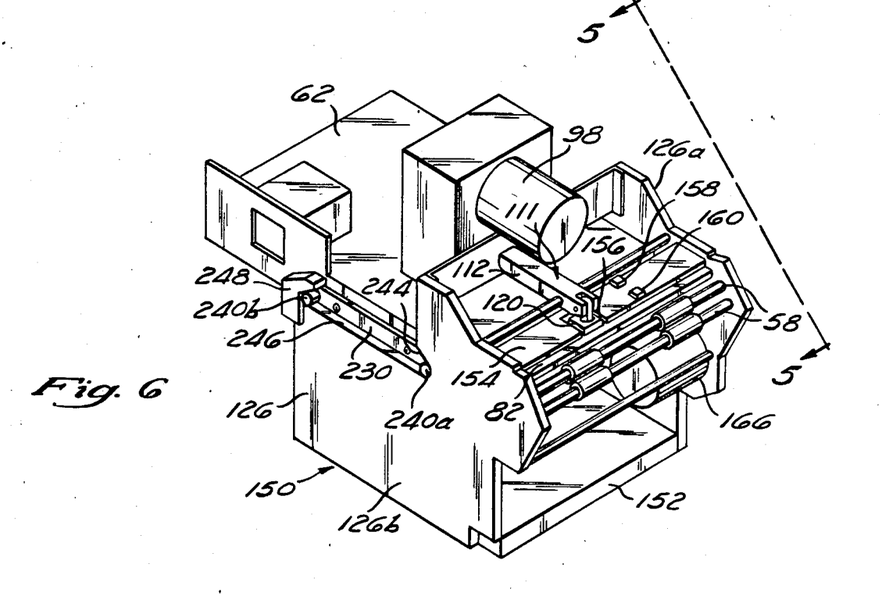
FIG. 6 is a perspective view taken from the left corner of the loader of this invention with a disk drive present.

Referring to FIGS. 5 and 6, the preferred embodiment uses a DC motor 166 to simultaneously drive the first and second set of rollers 58 and 60, respectively, through a built-in pulley arrangement. Referring to FIG. 5, a drive pulley 168 is connected to corresponding drive pulleys 170 and 172 on the first and second set of rollers 58 and 60, respectively. The drive pulley 170 is connected to the lower roller shaft 72b on the first set of rollers 58. The drive pulley 172 is connected to the lower drive shaft 76 on the second set of rollers 60. A flexible drive belt 174 connects the drive pulleys 168, 170, and 172 so that they all rotate in the same direction and at the same rate. A drive belt tension lever 176 is pivotally mounted at one end to the frame 126, with the other end having a idler pulley 178 is resiliently urged against the drive belt 174 by a spring 180 so as to maintain a predetermined tension on the drive belt 174. A motor 166 having a torque of 4 ounce-inches at zero rpm, has been found suitable. Preferably the pulley 168 has 16 teeth, the pulley 170 has 35 teeth, and the pulley 172 has 14 teeth.

Referring to FIGS. 4 and 7, disengagement of the floppy disk 20 from the drive spindle 64 and spindle drive 65 is accompanied by an upward motion of the plunger 88 and a corresponding re-engagement of the first set of rollers 60 with the trailing edge 20b of the floppy disk 20.

Referring to FIGS. 5 and 7, the floppy disk 20 is removed from the disk drive 62 (FIG. 7) by reversing the current to the motor 166 (FIG. 5) so that both the first and second set of rollers 58 and 60, respectively, reverse rotation. As the floppy disk 20 is extended by the second set of rollers 60, the ejector guide plate 66 directs the floppy disk 20 downwards so as to prevent re-engagement with the first set of rollers 58.

The detectors 158 and 160 sense the edges of the floppy disk 20 to signal that the floppy disk 20 has been removed from the disk drive 62 (detector 158) and has left the second set of rollers 60 (detector 160).

Referring to FIG. 4, the floppy disk 20 is pushed towards an ejection selector plate 50 which is pivotally mounted at the end distal from the approaching floppy disk 20. The ejection selection plate 50 serves to guide the floppy disks 20 into a lower stack of rejected disks 70 by rotating upwards so as to divert the trailing edge 20b of the floppy disk 20 down towards the stack 70. Conversely, the ejection selector plate 50 can direct the floppy disk 20 into an upper stack of accepted disks 68 (FIG. 2) or alternately, allow the accepted floppy disks 22 to exit into an accept bin (not shown). The ejection selection plate 50 is preferably rotated by a rotary solenoid 182 directly attached to the ejection selection plate 50.

In an alternate embodiment shown in phantom in FIG. 4, a rotary solenoid 184 is connected to the forward edge of the ejection selection plate 50 towards the first set of rollers 58. This connection is obtained by a linkage bar 186 such that rotation of the rotary solenoid 184 causes the linkage 186 to rotate the ejection selection plate 50 and cause the floppy disks 20 to be directed either above or below the ejection selection plate 50. Directly connecting the rotary solenoid 182 to the ejection selector plate 50 provides a simpler mechanism, but requires additional room on the side of the ejection selection plate 50. Using the rotary solenoid 184 and the linkage 186, allows the rotary solenoid 184 to be placed away from the ejection selection plate 50 and may provide more economical space saving in some instances.

Figure 12:
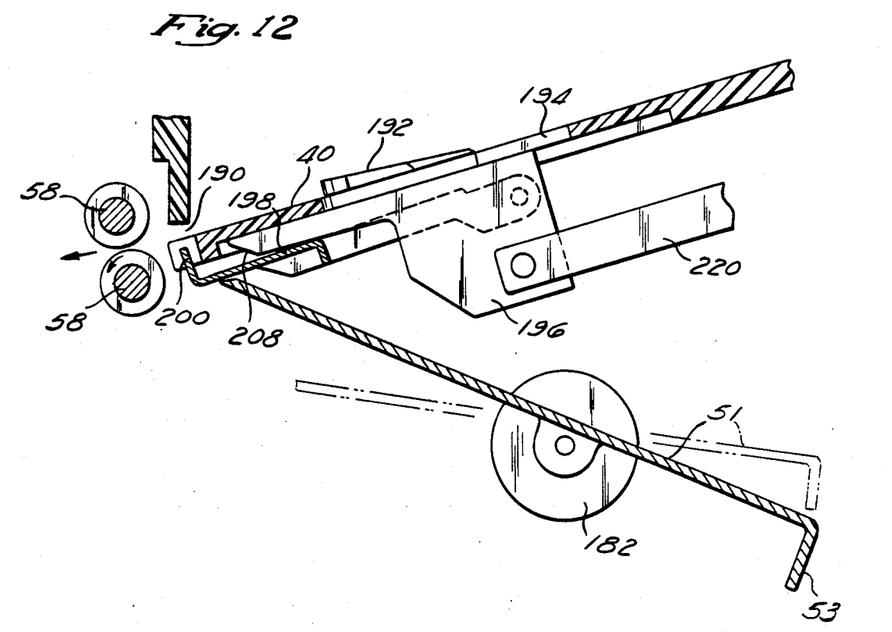
FIG. 12 is a partially sectioned view taken along 12—12 of FIG. 14, showing the mechanism for feeding floppy disks into the first set of rollers.

FIG. 12 shows an alternate embodiment of the ejection selector plate 51 wherein the plate 51 is a substantially thin sheet of material with a downwardly depending lip 53 on one end. The rotary solenoid 182 is mounted at about the center of gravity of the ejection selector plate 51 for ease of rotation.

The manner in which the floppy disks 20 are fed from the loading chute 38 into the first set of rollers 50 will be described with reference to FIGS. 4, and 6-8. Referring first to FIG. 4, the bottom 40 of the loading chute 38 is mounted to allow a slight manual adjustment of a discharge slot gap 190 through which the floppy disks 20 in the stack 44 are passed in order to enter the first set of rollers 58. The gap 190 is defined by the space between the back wall 42 and the bottom 40 of the loading chute 38. It is important that the gap 190 be a precisely defined width so that one and only one floppy disk 20 may pass through the gap 190 at a single time. A preferred mounting arrangement for the base 40 is to have mounting bolts connecting to the sides of the bottom 40 in which the holes for the bolts at the lower end of the bottom 40 are slightly oversized, thus allowing the bottom 40 to be slightly pivoted, in order to allow adjustment of the width of the gap 190.

Referring next ot FIG. 6, a picker wedge 192 comprises a tapering, metal block having a generally "T" shaped cross-section which fits into and slides along a slot 194 which extends through the bottom 40. The picker wedge 192 is shaped to grip a circular jacket hole 28 (FIG. 13) in the floppy disk 20 for pushing the floppy disk 20 forward. The wedge 192 is tapered to allow the floppy disk 20 to continue moving in a forward direction over the wedge 192 as the first set of rollers 50 (FIG. 4) pull the floppy disk 20 into the disk drive 62.

Referring to the wedge 192 is bolted to a picker block 196 located on the underside of the bottom 40. Because of the "T" shaped cross-section of the wedge 192, the wedge 192 and the picker block 196 are constrained to slide back and forth on the bottom 40, along the slot 194.

A feed inhibit bracket 198 has a lip 200 which extends upwards through a cut-out 202 in the bottom 40 adjacent the gap 190 (FIG. 4). The feed inhibit bracket 198 is normally in an "up" position so that the lip 200 projects through the cut-out 202 and prevents floppy disks 20 from sliding off the bottom 40 and into the first set of rollers 58. As the picker block 196 slides forward and downwards, the feed inhibit bracket 198 is automatically moved to a "down" position which lowers the lip 200 in the cut-out 202 below the surface level of the bottom 40, so that a floppy disk 20 may be pushed by the picker wedge 192 towards the first set of rollers 58. A detector 204, preferably an optical detector, is located in the bottom 40 in order to detect the presence of floppy disks 20 on the bottom 40. In the preferred embodiment, the optical detector 204 detects when light is obstructed by floppy disks 20 overlying the detector 204 on the bottom 40.

Figures 15, 16:
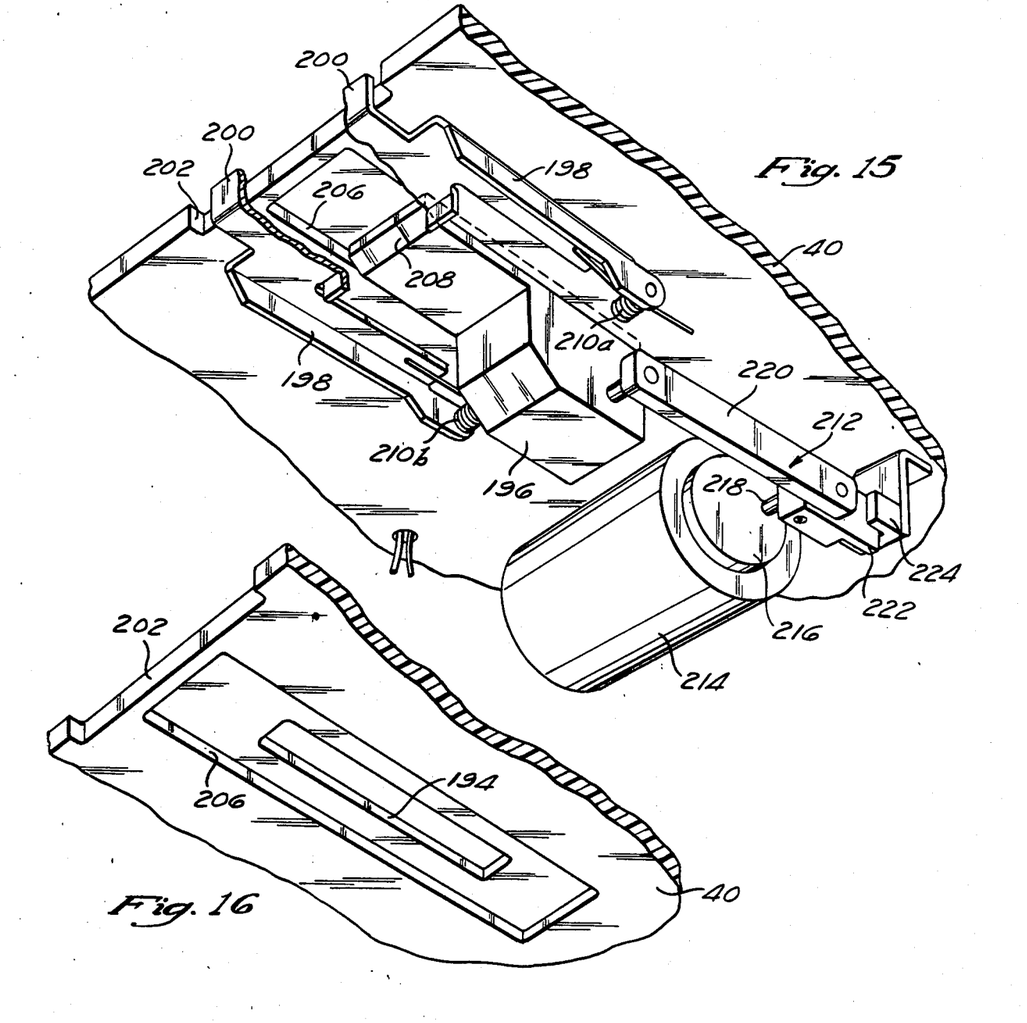
FIG. 15 is a perspective view of the bottom of the picker mechanism of this invention.
FIG. 16 shows the grooved slot in which the picker mechanism of this invention slides.

Referring next to FIG. 15, the picker block 196 slides in a flat-bottomed, recessed groove 206 in the lower surface of the bottom 40. The groove 206 serves to constrain the picker block 196 to a sliding motion along a straight line, which line is preferably parallel to the length of the slot 194.

The picker block 196 is equipped with a tapered front nose 208 at its forward end which is shaped to fit under the feed inhibit bracket 198. As the picker block 196 slides forward in the groove 206, the nose 208 pushes the feed inhibit bracket 198 downwards so that the lip 200 is pulled beneath the surface of the bottom 40 so that a floppy disk 20 can slide from the bottom of the stack 44 (FIG. 4) into the first set of rollers 58.

The feed inhibit bracket 198 is mounted to the underside of the bottom 40 by spring loaded hinge joints 210a and 210b, which allow the bracket 198 to pivot upwards and downwards and which further spring bias the bracket 198 in an "up" position so that when the picker block 196 is retracted, the lip 200 projects from the cut-out 202 and inhibits floppy disks 20 from sliding towards the first set of rollers 58. The spring loaded hinges 210a and 210b allow the bracket 198 to pivot upwards and downwards without causing undue metal fatigue. Because of the mechanical relationship between the picker block 196, nose 208, and feed inhibit bracket 198, movement of the picker block 196 serves to both move the picker wedge 192 and the engaged floppy disk 20 forward towards the gap 190 (FIG. 4) but also holds the feed inhibit bracket 198 downwards so that a floppy disk 20 can be fed through the gap 190 (FIG. 4) into the first set of rollers 58.

The picker block 196 and thus the picker wedge 192 are driven along the slot 194 by a reciprocating mechanism 212. The reciprocating mechanism 212 comprises a drive motor 214 whose drive shaft (not shown) is connected to a circular disk 216. The disk 216 contains an eccentrically mounted shaft 218 which is rotationally connected to the first end of a linkage bar 220. The opposite end, or second end of the linkage bar 220 is rotatably connected to the picker block 196. The reciprocating mechanism 212 is somewhat analogous to the eccentric drive on the old fashoned steam locomotives wherein the eccentrically mounted shaft 218 causes a translation of the picker block 196, but all of the rotation is accommodated by the rotational mounting of the linkage bar 220. Preferably the motor 214 is a 20 ounce-inch DC motor with a 34:1 gear reduction.

A projection 222 is mounted to the eccentrically mounted shaft 218 so that the projection 222 can be detected by a detector 224, which preferably takes the form of an optical sensor such as an infrared detector. The projection 222 and the detector 224 are preferably located such that the projection 222 is detected by the detector 224 when the picker wedge 192 is in the maximum retracted position wherein the picker wedge 192 is the furthest distance from the lip 200.

Figure 19:
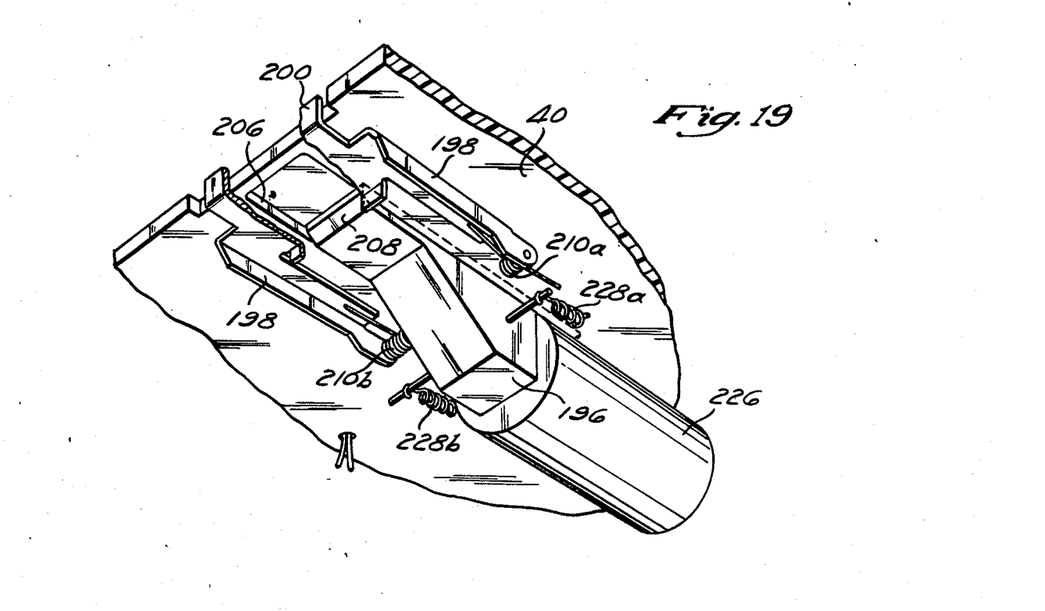
FIG. 19 is a perspective view of an alternate embodiment of the picker drive mechanism of this invention.

An alternate embodiment of the drive means for the picker block 196 and thus for the picker wedge 192 is shown in FIG. 19. In the alternative embodiment, a linear solenoid 226 is directly connected to the picker block 196 in order to move the picker block 196 back and forth along the length of the groove 206. The picker block 196 is equipped with a pair of retraction springs 228a and 228b which serve to automatically pull the picker block 196 backwards and upwards when the solenoid 226 is deactuated. The retraction springs 228a and 228b are mounted symmetrically to the picker block 196 so that it is retracted smoothly without twisting or binding. The retraction springs 228 are connected to a grounded or fixed structure such as the frame 150 or the housing 36.

Figure 14:
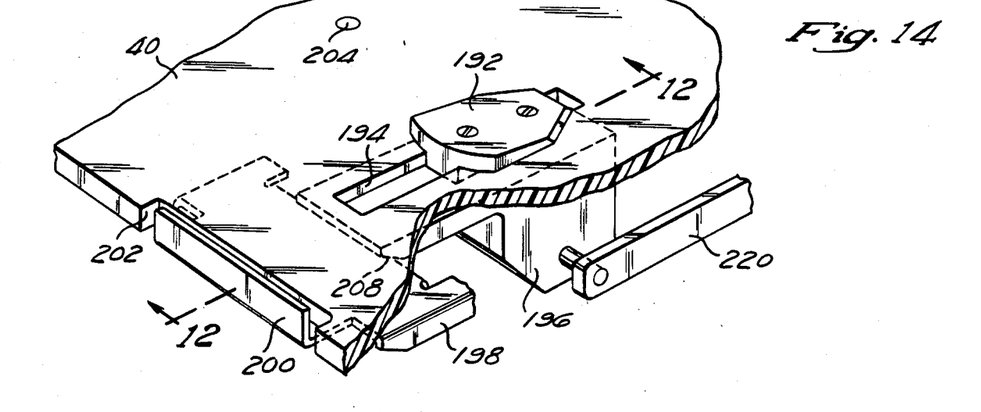
FIG. 14 is a perspective view showing the picker mechanism of this invention.

Referring next to FIG. 16, the groove 206 is aligned with the slot 194 so that when the picker block 196 (FIG. 15) and the wedge 192 (FIG. 14) are bolted together from opposite sides of the bottom 40, the wedge 192 will slide smoothly along a straight line along the length of the slot 194.

Referring next to FIG. 12, the feed inhibit bracket 198 is shown in a "down" position so that the lip 200 is beneath the surface of the bottom 40. The feed inhibit bracket 198 assumes this "down" position when the picker block 196 slides forward (as shown) so that the nose 208 is between the bottom 40 and the feed inhibit bracket 198. The picker block 196 has an elongated shape so that the slot 194 (FIG. 16) is entirely covered by the picker block 196 as the block 196 slides back and forth in the groove 206 (FIG. 15 or 16).

The linear solenoid 226 has a flared actuator bar which slides into a slot of the picker block 196 for ease in assembly and to allow some flexibility in the interconnection between the solenoid 226 and the picker block 196.

The reciprocating mechanism 212 of the preferred embodiment provides a smoother, more uniform, and more positively controlled movement of the floppy disks 20 from the loading chute 38 (FIG. 4) into the first set of rollers 58 (FIG. 4), then does using the linear solenoid 226 of the alternate embodiment.

Figure 17:
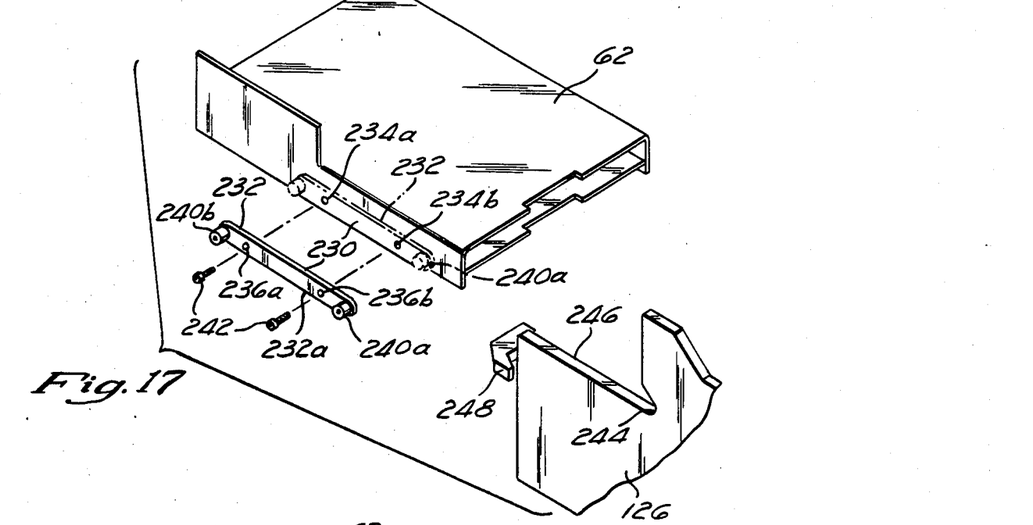
FIG. 17 is an exploded perspective view showing how a positioning plate attaches to a disk drive.

Referring next to FIG. 17, a disk drive 62 is shown with a positioning plate 230 on both sides (only one side shown) of the disk drive 62. The positioning plates 230 enable a variety of disk drives 62 to be used with the same loader 34, without requiring extensive alignment or calibration. The positioning plate 230 comprises a generally elongated member 232. Countersunk holes 236a and 236b are drilled in the positioning plate 230 to correspond with positioning location of the holes 234 in the disk drive 62. The location of the holes 234 vary with the manufacturer of the disk drive 62. At each end of the positioning plate 230 are located a positioning pin or dowel 240 which comprises a cylindrical dowel having a precise diameter. The dowels 240 are precisely located with respect to the counter sunk holes 236 so that when the positioning plate 230 is attached to the disk drive 62, the position of the dowels 240 are known with respect to the disk drive 62. Fasteners, such as screws with countersunk heads 242, fasten the positioning plate 230 to the holes 234 in the sides of the disk drive 62. The positioning dowel 240 adjacent the front of the disk drive 62 is designed to fit within a receiving means such as a recess 244 on the side plates 126.

Figure 18:
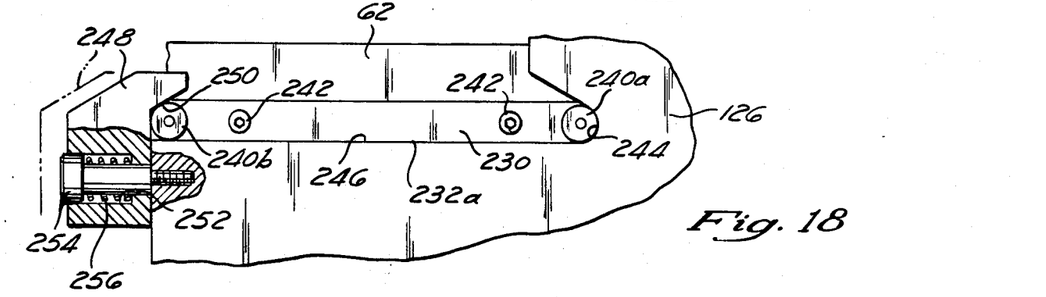
FIG. 18 shows how the positioning plate is positioned on the frame of the loader of this invention.

Referring to FIGS. 6 and 18, a disk drive 62 is connected to the side walls 126 by the positioning plate 230. The positioning dowel 240 fits into the recess 244 so as to precisely locate the disk drive 62 with respect to the recess 244, and thus with respect to the first and second set of rollers 58 and 60. The flat surface 246 (FIGS. 6 and 17) allows the dowels 240 to slide on the surface 246 so the front dowel 240 can be inserted into the recess 244 (one recess 244 is located on each side plate 126). The surfce 246 also helps maintain the positioning dowels 40, and thus the disk drive 62, on a predefined orientation with respect to the first and second set of rollers 58 and 60, respectively.

A spring loaded lock, such as positioning block 248 contains an inclined surface 250 which contacts and is urged against the rear positioning dowel 240b so as to urge the positioning plate forward and thus urge the forward positioning dowel 240a into the positioning recess 244. The inclined surface 250, and the recess 244 both curve around a portion of the positioning dowels 240 so as to prevent vertical movement of the positioning dowels 240. Thus, the positioning block 248 and the recess 244 serve to restrain the positioning dowels 240, and thus the disk drive 62, with respect to the side plates 126.

The positioning block 248 can be pulled outward, away from the side plate 126, and rotated to the side in order to allow the positioning dowels 240 to be placed on the surface 246. This positioning is accomplished by having a cylindrical aperture 252 into which is inserted a fastener such as bolt 254 such that the head of the bolt 254 is slidably contained within the cylindrical aperture 252. The bolt 254 is screwed into the side plate 126. A coil spring 256 around the bolt 254, fits between the shank of the bolt 254 and the cylindrical aperture 252, so as to preload the positioning block 248 against the rear positioning dowel 240b. By pulling the positioning block 248 away from the side plate 126, the spring 256 is compressed and the positioning block 248 can be rotated around the axis of the bolt 254 so as to allow free access to the surface 246 and thus allow easy insertion and removal of the disk drive 62. The spring 256 also urges the positioning block 248 against the rear positioning dowels 240b to insure positioning of the forward positioning dowels 240a in the recess 244.

In the preferred embodiment, the sequencing and timing of the operation of the first and second sets of rollers 58 and 60, the picker mechanism 56, and the ejection selector plate 50 and 51, the plunger mechanism 86, and the disk drive 62, are controlled by a computer 260 (not shown), which uses signals from the detectors 258 and 260, 106 and 108, to control and verify timing and sequencing of operations.

I claim:

1. A mechanism for loading and unloading floppy disks each of which consists of a disk rotatably mounted in a jacket into a disk drive, comprising:
    roller means for positively positioning the floppy disk in said disk drive, said roller means engaging said floppy disk until said floppy disk is accurately positioned in said disk drive so that said floppy disk is accurately positioned with minimal damage to said floppy disk;
    means for disengaging said roller means from said floppy disk subsequent to said accurate positioning so said disk can be unobstructively rotated within said jacket and for re-engaging said roller means with said floppy disk when said rotation ceases;
    drive means for rotating said roller means in two directions to feed said floppy disk into, and remove said floppy disk from, said disk drive; and
    a frame supporting said roller means and said drive means.

2. A mechanism as defined in claim 1 further comprising:
    a positioning plate attached to said disk drive at a predetermined location, said positioning plate containing at least one positioning pin; and
    positioning means for positioning said positioning pin with respect to said frame to achieve a predetermined alignment between said disk drive and said roller means attached to said frame.

3. A mechanism as defined in claim 1, further comprising:
    spacing and preload means for spacing said roller means a predetermined distance apart and exerting a predetermined force on said rollers so as to cause a preload on any floppy disk engaged by said roller means which is thicker than said predetermined spacing.

4. A mechanism as defined in claim 1, further comprising:
    an ejection guide plate for directing said floppy disk in a predetermined direction as said floppy disk emerges from said roller means.

5. A mechanism as defined in claim 1, further comprising:
    rotatable ejection selection means for directing said floppy disk from said roller means into at least two groups of said floppy disks.

6. A mechanism as defined in claim 1, further comprising:
    detecting means for detecting an edge of said floppy disk, said detector means cooperating with said drive means so said floppy disk is positively positioned within said disk drive at a predetermined location.

7. A mechanism as defined in claim 6, wherein said detector means further comprises:
    detector means cooperating with said drive means to vary the speed of said roller means.

8. A mechanism as defined in claim 1, wherein said roller means further comprises a first set of rollers which is not located in the plane of said disk drive, said first set of rollers feeding said floppy disk into said roller means.

9. A mechanism as defined in claim 8, further comprising:
    picker mechanism means for releasably engaging said floppy disk and transferring said disk to where said first set of rollers can engage said disk.

10. A mechanism as defined in claim 9, wherein said picker mechanism means includes a reciprocating linkage eccentrically connected to a rotating member so as to cause the picker means to reciprocatingly engage and disengage a floppy disk.

11. A mechanism as defined in claim 9, wherein said picker means engages a jacket on said floppy disk.

12. A mechanism for removably inserting a floppy disk consisting of a disk rotatably mounted in a jacket into a disk drive, comprising:
    a frame supporting said disk drive;
    a first set of rollers for engaging a floppy disk and moving said floppy disk towards said disk drive;
    a second set of rollers adjacent said disk drive for receiving the floppy disk from said first set of rollers and feeding said floppy disk into said disk drive, said second set of rollers engaging said floppy disk until said floppy disk is positively positioned within said disk drive;
    rotating means in said disk drive for engaging and rotating said disk in said jacket;
    engaging means for releasably engaging said rotating means with said disk;
    disengaging means cooperating with said engaging measn for disengaging said second set of rollers from said floppy disk so the disk can be unobstructively rotated within the jacket, and for re-engaging said second set of rollers with said floppy disk after rotation of said disk; and
    drive means for rotating said first and second sets of rollers, and for reversably rotating at least said second set of rollers so as to insert said floppy disk into, and remove said floppy disk from, said disk drive.

13. A mechanism as defined in claim 12, further comprising:

positioning means attached to said disk drive at a predetermined location, said positioning means containing at least one positioning pin; and positioning recesses in said frame cooperating with said positioning pins so that said disk drive can be positioned in a predetermined location with respect to said frame, said first and second sets of rollers also being positioned on said frame with respect to said positioning recesses.

14. A mechanism as defined in claim 12, wherein the plane between said first and second sets of rollers is inclined with respect to the plane between the disk drive and the second set of rollers.

15. A mechanism as defined in claim 12, further comprising:

detector means for detecting the leading edge of said floppy disk as it passes between said first and second set of rollers, said detector means cooperating with said drive means to reduce the rotational speed of said rollers.

16. A mechanism as defined in claim 15, further comprising:

detector means for detecting an edge of said floppy disk, said detector means cooperating with said drive means to back-drive said drive means to counteract the inertia of said drive means and positively and accurately position said floppy disk in said disk drive.

17. A mechanism as defined in claim 12, further comprising:

picker mechanism means for feeding a floppy disk into said first set of rollers.

18. A mechanism as defined in claim 17, wherein said picker means includes a picker block having an engaging edge to releasably engage said floppy disk, said picker block being reciprocatively driven by a linkage eccentrically connected to a rotating member so as to cause the picker block to engage said floppy disk smoothly and slowly, yet move said picker block at an increased speed thereafter.

19. A mechanism as defined in claim 17, further comprising:

a loading chute for containing a plurality of stacked floppy disks; and positioning guide means on a bottom of said loading chute for correctly positioning the bottom most floppy disks on said stack to insure correct alignment of a disk within a jacket on said floppy disks.

20. A mechanism as defined in claim 12, wherein said engaging means comprises:

a slidable plunger having one end which engages said rotating means to engage said rotating means with said disk; and reversible drive means for sliding said plunger to controllably engage said rotating means with said disk.

21. A mechanism as defined in claim 20 further comprising:

detector means for detecting the position of said plunger drive means to indicate proper engagement of said rotating means with said disk.

22. A mechanism as defined in claim 20, wherein said disengaging means comprises:

a pivoted lever having a first end communicating with said plunger, and a second end communicating with a first roller of said second set of rollers, said lever pivoted to provide a mechanical advantage and reduce the force exerted on said lever to move said first roller, said first roller being mounted to said frame so as to allow motion of said first roller sufficient to disengage said first roller from a floppy disk placed in said second set of rollers.

* * * * *